United States Patent
Shin et al.

(10) Patent No.: US 6,645,674 B2
(45) Date of Patent: Nov. 11, 2003

(54) ETHER DERIVATIVE ADDITIVE IN NONAQUEOUS ELECTROLYTE OF A LITHIUM SECONDARY BATTERY

(75) Inventors: Jeong-soon Shin, Chungcheongnam-do (KR); Jin-sung Kim, Seoul (KR); Eui-sun Hong, Chungcheongnam-do (KR); Jong-wook Lee, Chungcheongnam-do (KR); Young-gyu Kim, Daejeon (KR); Jong-seob Kim, Daejeon (KR)

(73) Assignees: Samsung SDI Co., Ltd., Kyungki-do (KR); Cheil Industries Inc., Kyungsangbuk-do (KR)

( * ) Notice: Subject to any disclaimer, the term of this patent is extended or adjusted under 35 U.S.C. 154(b) by 194 days.

(21) Appl. No.: 09/761,764

(22) Filed: Jan. 18, 2001

(65) Prior Publication Data

US 2001/0018146 A1 Aug. 30, 2001

(30) Foreign Application Priority Data

Jan. 25, 2000 (KR) .......................... 2000-3394

(51) Int. Cl.$^7$ ............................... H01M 4/58
(52) U.S. Cl. ................ 429/231.95; 429/61; 429/62; 429/188; 429/300; 429/303; 429/306; 429/322; 429/324; 429/326; 429/330; 429/333; 429/335; 429/338; 429/341
(58) Field of Search ................ 429/61, 62, 231.95, 429/188, 300, 303, 306, 322, 324, 333, 335, 338, 341, 326, 330

(56) References Cited

U.S. PATENT DOCUMENTS 5,709,968 A 1/1998 Shimizu
5,776,627 A * 7/1998 Mao et al. .................... 429/61

FOREIGN PATENT DOCUMENTS

| JP | 10-064591 | | 3/1998 | |
|---|---|---|---|---|
| JP | 10-074537 | * | 3/1998 | .......... H01M/10/40 |
| JP | 2000-058117 | * | 2/2000 | .......... H01M/10/40 |

OTHER PUBLICATIONS

Yang et al., "Composition analysis of the passive film on the carbon electrode of a lithium–ion battery with an EC–based electrolyte", Journal of Power Sources 72 (1988) 66–70.

* cited by examiner

Primary Examiner—Patrick Ryan
Assistant Examiner—Angela J. Martin
(74) Attorney, Agent, or Firm—Leydig, Voit & Mayer, LTD

(57) ABSTRACT

The present invention provides a lithium secondary battery comprising a cathode electrode containing a lithium complex oxide; an anode electrode containing metal lithium or its alloy, or carbon material; and a nonaqueous organic electrolyte containing a nonaqueous organic solvent, a lithium salt and an aromatic ether that can react to form dimers or polymers above a certain temperature and voltage and that can be expressed by Formula 1 below:

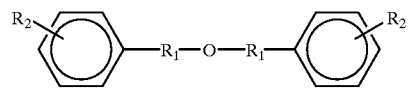

Formula 1 wherein, $R_1$ is independently a single bond or an alkylene group with less than or equal to 2 carbons and $R_2$ is hydrogen or an alkyl group with less than or equal to 2 carbons.

The lithium secondary battery has the advantage that its characteristics are maintained, even if it is left in its fully charged state at a high temperature for a long time and, at the same time, its reliability and stability have been improved.

5 Claims, 2 Drawing Sheets

ETHER DERIVATIVE ADDITIVE IN NONAQUEOUS ELECTROLYTE OF A LITHIUM SECONDARY BATTERY

BACKGROUND OF THE INVENTION

1. Field of the Invention

The present invention relates to a lithium secondary battery, and more particularly to a secondary lithium battery having an excellent stability and reliability even with leaving the charged state at a high temperature.

2. Description of the Related Art

As the portable electronic devices such as cellular phones and notebook computers become miniaturized and high-powered and automobiles without environmental contamination are realized, the demand for high power secondary batteries increases explosively, and one of the most noticed batteries among these is based on nonaqueous fluids, that is the lithium secondary battery.

The lithium secondary battery constitutes a cathode and an anode comprising materials that can intercalate and deintercalate lithium ion reversibly, a nonaqueous electrolyte fluid and additional materials that maintain and separate these appropriately. While the lithium secondary battery due to its light weight and excessively low potential has an excellent characteristics of high voltage and capacity, compared to other alkali batteries or nickel-hydrogen, nickel-cadmium batteries, it also has a disadvantage that it can easily short due to the dendrite deposited.

The internal shorting of the lithium secondary battery in the charged state can lead to the problem of firing or explosion caused by the explosive reaction of the organic electrolyte fluid and the active material of the cathode and anode.

Therefore, attempts to ensure the safety in the excessively charged state have been made by the method disclosed in U.S. Pat. No. 5,709,968 where the shut down of the separator is facilitated by adding aromatic compounds such as difluoroanisole when excessively charged and the method disclosed in U.S. Pat. No. 5,776,627 where a current blocking apparatus is operated using additives such as non-phenyl materials that produce gases by polymerization above the normal operation voltage.

Meanwhile, in the case where carbon material is used as an anode of the lithium secondary battery, the solid electrolyte interface (SEI) of a kind of a passivation layer forms in the electrode plate surface, and these SEI films can cause the following problems induced by the reaction with the electrolyte solution at high temperature.

In the formation process, the lithium ion emitted from the lithium complex oxide of the cathode material migrates to the anode and is intercalated, and at this point, the highly reactive lithium ion react with the anode electrode to form $Li_2CO_3$, $LiO$, $LiOH$, etc, and these compounds form the SEI films at the electrode plate surface.

Since these SEI films are nonconductors, the recharged lithium ions that are moving toward the anode keep the anode material or other materials from reacting. At the same time, because the SEI films work as an ion tunnel and let only lithium ions pass through, the electrode structure is prevented from collapsing by cointercalation, at the anode, of the organic solvent that solvate the lithium ions, thereby carrying the ions. Consequently, once the SEI films form, the amount of the lithium ion can be maintained reversibly and the lifetime characteristics of the battery can also be improved.

The SEI films are relatively solid under the normal condition, i.e., at the temperature range of $-20$–$60°$ C. and at the voltage of less than 4 V and thus they can sufficiently play the role of stopping the negative reaction between the anode and the electrolyte. However, when stored at high temperature in the fully charged state (for example, after charging 100% at 4.2 V, left at 85° C. for four days), there is a problem that the durability of the SEI films decays slowly.

In other words, if stored at high temperature in the fully charged state, the SEI films slowly decay due to the chemical and thermal energies increasing as time goes by and thus the anode electrode plate is exposed. The surface of the latter plate exposed in this way reacts with the surrounding electrolyte, and this negative reaction continuously occurs to generate the gases such as $CO$, $CO_2$, $CH_4$, $C_2H_6$, etc., thereby causing an increase in the internal pressure of the battery (J. Power Sources 72, 1998, 66–70).

If the internal pressure of the battery increases, in the case of cylindrical batteries the battery completely loses its function as a battery since it is stopped fully by the operation of the current interrupt device (CID) of excessive current and it reaches a complete stop. Also, in the case of rectangular batteries and pouch type batteries without the CID, a problem arises that it is impossible to load in the main body due to increase in the thickness of the battery occurs.

Meanwhile, Japanese Patent Publication No. hei 10-64591 indicated that as one of the aggravation factors of the cycle characteristics, the organic solvent of the electrolyte disintegrates by oxidation and the disintegration products accumulates on the cathode, thereby impeding preferable reactions in the battery inside, and discloses a method of adding a variety of reduction materials in order to prevent these disintegration by oxidation from occurring. In other words, it means that if the potential of the cathode increases slowly by charging, there can be small spots whose potential is excessively high and strongly oxidative chemical species form in these spots of excessive voltage, and that the disintegration by oxidation of the organic solvent thus occurs. It is also mentioned that in this case, if a suitable additive with a preferable potential (suitable reductivity) is present, this additive first disintegrates by oxidation, thus blocking the disintegration by oxidation of the organic solvent.

Also, Japanese Patent Publication No. hei 10-74537 mentioned that the disintegration of the electrolyte is prohibited by adding an additive that can first react with active oxygen produced in the cathode.

As described above, the prior art mainly use methods that prohibit the disintegration by oxidation of the organic electrolyte by adding an additive that first reacts with the strongly oxidative chemical species produced in the reaction of the electrode and the organic electrolyte.

However, the problems of stability and reliability when left at high temperature remain to be solved.

The technical task the present invention intends to solve is to provide a concept different from the method of the prior art, e.g., a lithium secondary battery that can offer an excellent stability and reliability even when stored at high temperature in the fully charged state.

SUMMARY OF THE INVENTION

The technical object of the present invention can be achieved by a lithium secondary battery comprising a nonaqueous organic electrolyte fluid that comprises a cathode electrode containing a lithium complex oxide, lithium metal or its alloy, an anode electrode containing carbon material, and a nonaqueous organic solvent, a lithium salt and an aromatic ether that can react to form dimers or polymers above a certain temperature and voltage, expressed by Formula 1 below.

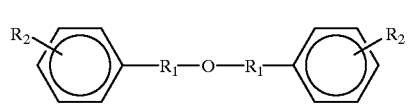

Formula 1 wherein, $R_1$ is independently a single bond or an alkylene group with less than or equal to 2 carbons and $R_2$ is hydrogen or an alkyl group with less than or equal to 2 carbons.

According to the examples of the invention, the aromatic ether expressed by the above Formula 1 is preferably diphenyl ether or dibenzyl ether, and its content is preferably 0.1–5.0% by weight with respect to the total weight of the above nonaqueous organic solvent and the lithium salt.

In the present invention, for the lithium complex oxide of active electrode material, the metal lithium of active anode material, its alloy or carbon material, it does not matter that any materials in normal use in this field are used.

Also, as for the nonaqueous organic solvent, it is not particularly limited as long as it can be used in the field of the present invention, and in particular, it is preferably at least one selected from the group consisting of propylene carbonate (PC), ethylene carbonate (EC), ethylmethyl carbonate, methyl acetate, γ-butyrolactone, 1,3-dioxolane, dimethoxy ethane, dimethyl carbonate, diethyl carbonate, tetrahydrofuran (THF), dimethyl sulfoxide and polyethylene glycol dimethyl ether.

Also, as for the lithium salt, it is not particularly limited as long as it dissociates to produce the lithium ion, and the particular examples are lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$), lithium bistrifluoromethanesulfonylamide ($LiN(CF_3SO_2)_2$), and its content is of the normal level.

In the present invention, the lithium secondary battery may comprise a separator made of multi-porous films.

DESCRIPTION OF THE PREFERRED EMBODIMENTS

The present invention is characterized in than an aromatic ether which can react to form dimers or polymers above a certain temperature and voltage is added to the nonaqueous electrolyte solution in the lithium secondary battery.

In other words, the aromatic ether that is added to the nonaquaeous organic electrolyte solution of the lithium secondary battery is a material that shows the behavior of being stable at the normal operation temperature range of –20–60° C. and at 4.2 V ($Li/Li^+$). However, at higher temperature and voltage ranges, the aromatic ether become dimers or polymers to form a polymer film on the surface of the anode plate. If this polymer film forms, the internal resistance increases, and this in turn shows the effect of suppressing increase in the internal pressure even if left at high temperature for a long time.

Figure 1:
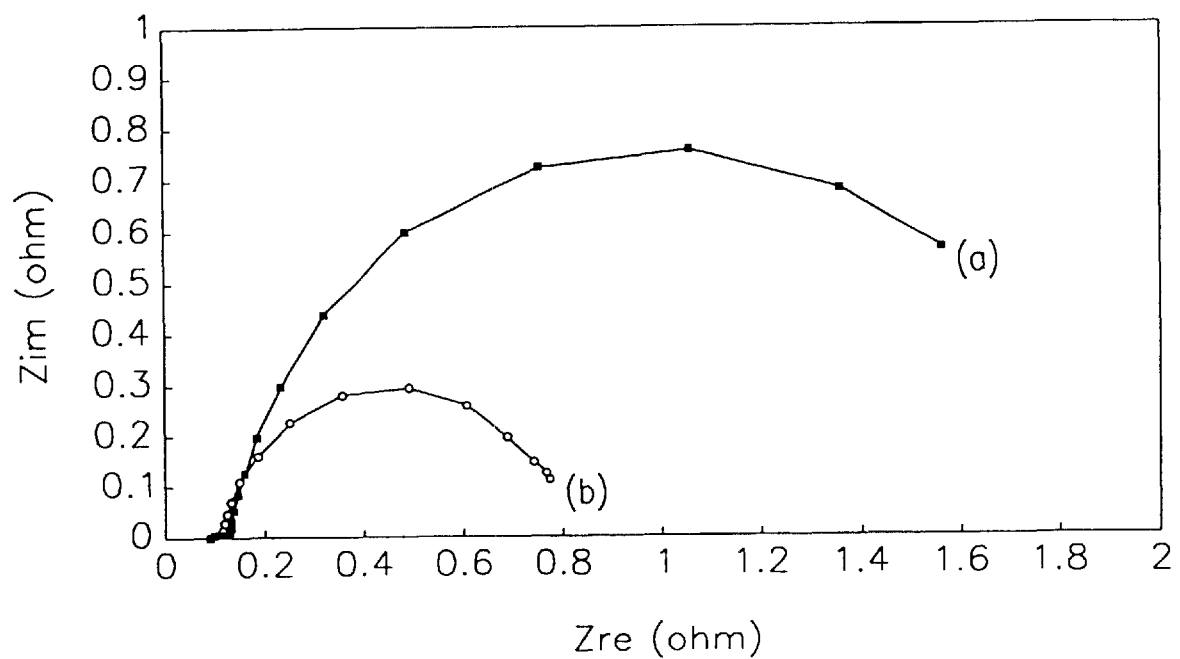
FIG. 1 is a graph illustrating the measured impedances of the lithium secondary batteries of the present invention and of the prior art.

FIG. 1 is a graph illustrating the impedances measured after the battery manufactured by adding 3% by weight of the aromatic ether with respect to the total weight of the mixed organic solvent and the lithium salt (a) and the normal battery without adding the aromatic ether (b) are left at 85° C. for four days.

Referring to FIG. 1, it can be seen that the internal resistance of the battery (a) is very large compared to that of the battery (b). That is, this is because in the case of the battery of the invention, when left at high temperature for a long time, a polymer film forms on the SEI film of the anode plate surface.

If the polymer film forms, the reaction between the electrolyte solution and the anode electrode can be suppressed since the SEI film does not integrate under the condition of high temperature and high voltage.

Therefore, the possibility of initiating the operation of the CID of the cylindrical lithium secondary battery or of expanding the thickness of the rectangular battery, due to the gas production by the reaction of the electrolyte solution and the anode, may be removed.

If it is seen only in the light of the point of improving the stability and credibility, it is better as the addition amount of the aromatic ether is larger. But if the addition amount is too large, there is a problem of decreasing the lifetime characteristics of the battery. Thus it is important to determine a right addition amount. The preferable range of the addition amount is, as described earlier, 0.1–5% by weight with respect to the total weight of the nonaqueous organic solvent and the lithium salt.

The aromatic ether that can be added to the lithium secondary battery according to the invention is preferably the compound of Formula 1 below, more preferably phenyl ether of Formula 2 and dibenzyl ether of Formula 3 as for example.

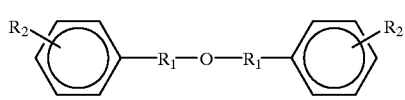

Formula 1 wherein, $R_1$ is independently a single bond or an alkylene group with less than or equal to 2 carbons and $R_2$ is hydrogen or an alkyl group with less than or equal to 2 carbons.

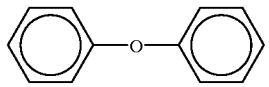
Formula 2

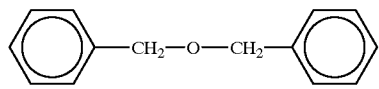
Formula 3

The invention is described below in detail with reference to examples. However, the examples only illustrate the invention and thus the scope of the invention is not limited to them.

EXAMPLE 1

Lithium cobalt oxide, polyvinylidene fluoride and carbon black were mixed in the ratio of 92:4:4 by weight and the cathode active material slurry was prepared by dispersing the mixture in N-methyl-2-pyrrolidone. After this slurry was coated on an aluminum foil of the size 20 μm, the cathode plate was manufactured by drying and rolling.

Subsequently, carbon (the product name: MCF, PETOCA Co.) and polyvinylidene fluoride were mixed in the ratio of 92:8 by weight and the anode active material slurry was prepared by dispersing the mixture in N-methyl-2-pyrrolidone. After this slurry was coated on a copper foil of the size 15 μm, the anode plate was manufactured by drying and rolling.

Next, after $LiPF_6$ 1.0 M was added to the mixed organic solvent of ethylene carbonate and dimethyl carbonate (the mixture ratio is 5:5), the electrolyte solution was prepared by adding diphenyl ether. Here, the addition amount of diphenyl ether was 1.0% by weight with respect to the total weight of the mixed organic solvent and $LiPF_6$.

The electrode structural body was manufactured by inserting a separator (the product name: N-710, ASAHI Co.) made of a polyethylene resin between the cathode and anode plates manufactured as described earlier and winding. This structural body was then inserted into a cylinder can of the type 18650 of the battery case and the above electrolyte solution was then introduced. 25 cylinder lithium secondary batteries were completed by crimping and pressing.

At this time, the operation voltage of the CID of excessive current of each battery was set to be 13±3 kgf.

EXAMPLE 2

In the same way as in Example 1 except that the addition amount of diphenyl ether was 3.0% by weight, 25 cylinder secondary batteries were manufactured.

EXAMPLE 3

In the same way as in Example 1 except that the addition amount of diphenyl ether was 5.0% by weight, 25 cylinder secondary batteries were manufactured.

EXAMPLE 4

In the same way as in Example 1 except that dibenzyl ether was added instead of diphenyl ether, 25 cylinder secondary batteries were manufactured.

COMPARATIVE EXAMPLE 1

In the same way as in Example 1 except that diphenyl ether was not added when manufacturing the electrolyte solution, 25 cylinder secondary batteries were manufactured.

The following characteristics test were performed on the batteries manufactured in Examples 1–4 and Comparative example 1.

High Temperature Characteristics Test

After charging the manufactured batteries under the CC-CV condition with the current of 320 mA and the charging voltage of 4.2 V, they were left for one hour. They were then discharged to 2.5 V with 320 mA and left for one hour. After this process of charging and discharging was repeated three times, they were charged with the current of 1600 mA and the charging voltage of 4.2 V for two and half hours.

These batteries were left at a high temperature chamber for four days and it was confirmed whether the CID operated by the internal pressure produced inside of the batteries, and the number of batteries was counted. The results are shown in Table 1.

TABLE 1

| | first day | second day | third day | fourth day | fifth day | sixth day | seventh day | eighth day |
|---|---|---|---|---|---|---|---|---|
| Example 1 | — | — | — | 1 | 3 | 6 | 10 | 21 |
| Example 2 | — | — | — | — | 2 | 4 | 8 | 15 |
| Example 3 | — | — | — | — | — | 2 | 3 | 9 |
| Example 4 | — | — | — | 1 | 5 | 14 | 20 | 25 |
| Comparative example 1 | — | — | 1 | 5 | 10 | 23 | 23 | |

From the results of Table 1, it can be seen that in the case of the cylinder lithium secondary batteries where the prescribed amount of the aromatic ether was added according to the invention, even if the batteries were left at 85° C. for more than four days, the CID did not almost operate, whereas in the case of the prior batteries where the aromatic ether is not added, the CID started to operate from the third day and the CID operated in almost more than half of the batteries after the fifth day was passed.

Lifetime Characteristics Test

After the batteries were charged with the current of 1600 mA and the voltage of 4.2 V for two and half hours and paused, they were charged and discharged for 300 cycles under the condition that they were paused for one hour after discharging with the current of 1600 mA and the voltage of 2.5 V. The results were shown in FIG. 2.

Figure 2:
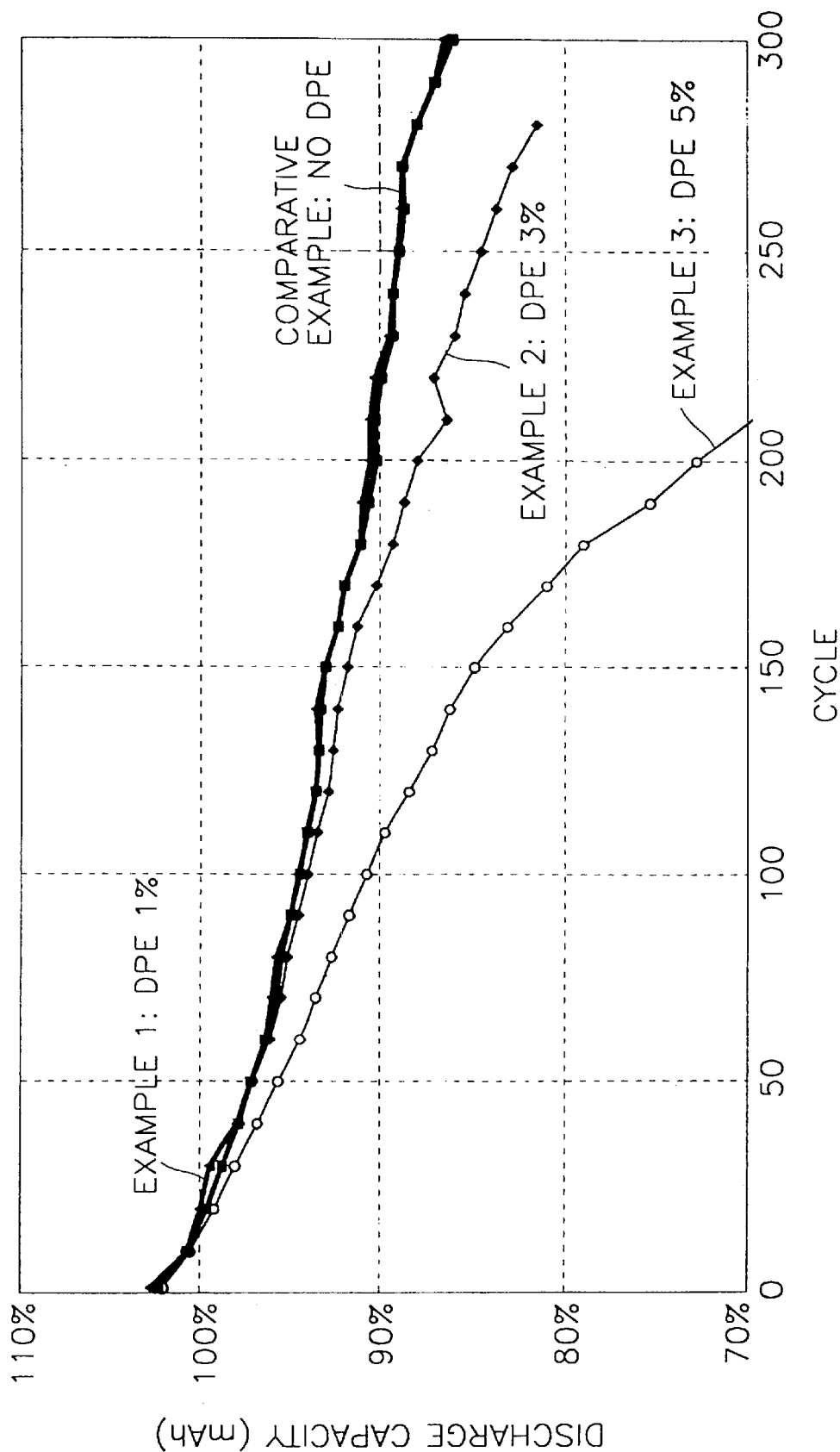
FIG. 2 is a graph illustrating the lifetime characteristics of the lithium secondary batteries of the present invention and of the prior art.

Referring to FIG. 2, it can be seen that the lifetime characteristics of the lithium secondary batteries where diphenyl ether is added according to the invention lowers a little compared to that of the prior batteries without the addition of diphenyl ether and that the lifetime characteristics lowers more as the addition amount of diphenyl ether increases. However, it is not a big problem practically since the influence on the lifetime characteristics if the addition amount of diphenyl ether is less than 3% by weight with respect to the total weight of the organic solvent and the lithium salt, is slight. Although the lifetime characteristics lowering phenomenon is eminent if the addition amount of diphenyl ether reaches 5% by weight, this can be also a permissible range since there is no possibility of causing a big problem for a practical purpose. However, it is concluded that this range is not preferable since if the addition amount exceeds 5% by weight, the influence on the lifetime characteristics is too large compared to the internal pressure lowering effect.

EXAMPLE 5

In the same way as in Example 1 except that 25 batteries have a rectangular can shape of the size of 30 mm×48 mm×4.2 mm as the battery case, the lithium secondary batteries were manufactured.

EXAMPLE 6

In the same way as in Example 2 except that 25 batteries have a rectangular can shape of the size of 30 mm×48 mm×4.2 mm as the battery case, the lithium secondary batteries were manufactured.

EXAMPLE 7

In the same way as in Example 3 except that 25 batteries have a rectangular can shape of the size of 30 mm×48 mm×4.2 mm as the battery case, the lithium secondary batteries were manufactured.

COMPARATIVE EXAMPLE 2

In the same way as in Comparative example 1 except that 25 batteries have a rectangular can shape of the size of 30 mm×48 mm×4.2 mm as the battery case, the lithium secondary batteries were manufactured.

High Temperature Characteristic Test

After charging the batteries manufactured in Examples 5–7 and Comparative example 2 under the CC-CV condition with the current of 120 mA and the charging voltage of 4.2 V, they were left for one hour. They were then discharged to 2.5 V with 120 mA and left for one hour. After this process of charging and discharging was repeated three times, they were charged with the current of 600 mA and the charging voltage of 4.2 V for two and half hours.

These batteries were left for four days and their thicknesses were measured every 24 hours and the average of 5 batteries whose thicknesses were expanded largely was calculated. The results were shown in Table 2.

TABLE 2

|  | before test | after 1 day | after 2 days | after 3 days | after 4 days |
|---|---|---|---|---|---|
| Example 5 | 4.25 mm | 5.98 mm | 6.34 mm | 6.54 mm | 6.88 mm |
| Example 6 | 4.24 mm | 5.88 mm | 6.22 mm | 6.38 mm | 6.52 mm |
| Example 7 | 4.22 mm | 5.65 mm | 6.07 mm | 6.20 mm | 6.37 mm |
| Comparative example 2 | 4.53 mm | 6.50 mm | 7.46 mm | 8.32 mm | 8.32 mm |

From the results of Table 2, it can be seen that the thickness expansion rate of the rectangular batteries according to the invention is no more than about 74% compared to that of the prior rectangular battery.

Therefore, the characteristics of the lithium secondary batteries are maintained, even if they are left in their fully charged states at high temperature for a long time and at the same time their reliability and stability have been improved.

What is claimed is:

1. A lithium secondary battery comprising a cathode electrode containing a lithium complex oxide; an anode electrode containing metal lithium or its alloy, or carbon material; and a nonaqueous organic electrolyte containing a nonaqueous organic solvent, a lithium salt and diphenyl ether.

2. The lithium secondary battery of claim 1, wherein the content of the diphenyl ether is 0.1–5.0% by weight with respect to the total weight of the nonaqueous organic solvent and the lithium salt.

3. The lithium secondary battery of claim 1, wherein the nonaqueous organic solvent is at least one selected from the group consisting of propylene carbonate (PC), ethylene carbonate (EC), ethylmethyl carbonate, methyl acetate, γ-butyrolactone, 1,3-dioxolane, dimethoxy ethane, dimethyl carbonate, diethyl carbonate, tetrahydrofuran (THF), dimethyl sulfoxide and polyethylene glycol dimethyl ether.

4. The lithium secondary battery of claim 1, wherein the lithium salt is one or more species selected from the group consisting of lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$) and lithium bistrifluoromethanesulfonylamide ($LiN(CF_3SO_2)_2$).

5. The lithium secondary battery of claim 1, further comprising a separator made of multi-porous films.

* * * * *